United States Patent [19]

Piper et al.

[11] 3,754,104

[45] Aug. 21, 1973

[54] TRIMARAN AIR BEARING MAGNETIC TRANSDUCING ASSEMBLY

[75] Inventors: Ronald Newman Piper, London; Kenneth Stammers, Woking, both of England

[73] Assignee: International Computers Limited, London, England

[22] Filed: July 22, 1971

[21] Appl. No.: 165,023

[30] Foreign Application Priority Data

Oct. 1, 1970 Great Britain .................. 46,845/70

[52] U.S. Cl. .................... 179/100.2 P, 340/174.1 E

[51] Int. Cl. ........................................ G11b 5/60

[58] Field of Search .............. 179/100.2 C, 100.2 P; 340/174.1 F, 174.1 E; 346/74 MC

[56] References Cited

UNITED STATES PATENTS

| | | | |
|---|---|---|---|
| 3,579,214 | 5/1971 | Solyst | 340/174.1 F |
| 3,349,384 | 10/1967 | Kohn | 179/100.2 P |
| 3,516,081 | 6/1970 | Horsfall et al. | 340/174.1 E |

*Primary Examiner*—Terrell W. Fears
*Assistant Examiner*—Robert S. Tupper
*Attorney*—Frederick E. Hane et al.

[57] ABSTRACT

A magnetic transducing head is disclosed which is supported relative to a record medium by three pads spaced apart from one another in triangular formation. Two pieces of ferromagnetic material are bonded together by a non-magnetic material to produce an assembly having a transducing gap, the assembly being shaped in the region of the transducing gap to produce a magnetic head which also serves as one support pad. Two pads integrally formed on the ferromagnetic assembly provide the other supports.

3 Claims, 4 Drawing Figures

INVENTORS
RONALD NEWMAN PIPER
KENNETH STAMMERS
BY Hane, Baxley and Spiecens
ATTORNEYS

TRIMARAN AIR BEARING MAGNETIC TRANSDUCING ASSEMBLY

BACKGROUND OF THE INVENTION

The present invention relates to magnetic transducing head assemblies for use in apparatus for reading and recording information on a magnetic coating carried for example on a rigid disc or drum.

In order to ensure that the recording characteristics and the amplitude of the signal obtained from a magnetic head when used for reading information from a recording surface remain substantially constant it is necessary to maintain the transducing gap of the magnetic head in substantially constant relationship to the recording surface. For example with so-called in contact recording the magnetic head is supported so as to be in contact with the recording suface and if the recording surface in moving past the transducing gap has a component of motion perpendicular to its surface, it is necessary to ensure that the magnetic head is able to remain in contact with the recording surface despite said component of motion of the surface otherwise the head may lose contact with the surface with the consequence that the signal amplitude and resolution will vary. Similary in so-called out of contact recording the head is supported at a small distance from the recording surface and it is necessary for the distance to remain constant in order to avoid variations in the operation of the head.

It is known to support a magnetic head on the end of an arm and the position of the head relative to the recording surface is controlled by mounting the head on a platform which carries two projections spaced apart from each other and from the head such that the head and the projections lie at the apices of a triangle and ride on the recording surface. Thus the head runs in contact with the recording surface and the two projections ensure that the head remains in correct alignment relative to the recording surface.

SUMMARY OF THE INVENTION

According to the invention a magnetic transducing head assembly includes two ferromagnetic elements bonded together in spaced relationship by a non-magnetic material; the ferromagnetic elements being formed to provide three projections spaced apart from one another in triangular formation each having a support surface thereon, a first one of said support surfaces being intersected by said non-magnetic material to provide a transducing gap therein and second and third ones of said support surfaces being substantially coplanar with said first support surface.

BRIEF DESCRIPTION OF THE DRAWING

Magnetic transducing head assemblies embodying the present invention will now be described, by way of example, with reference to the accompanying drawing in which.

DESCRIPTION OF THE PREFERRED EMBODIMENTS

Figure 1:
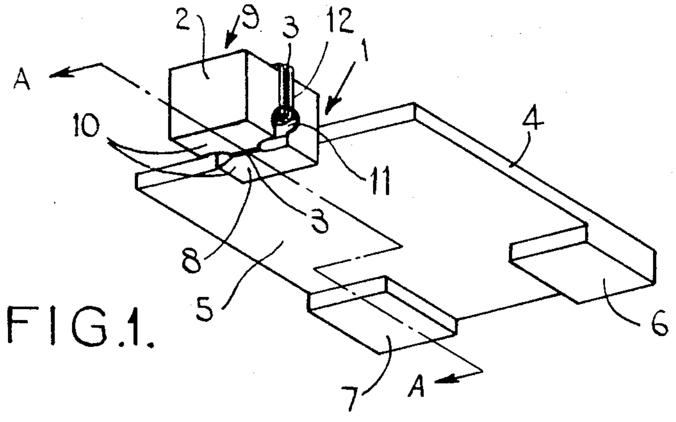
FIG. 1 is an underneath view of a magnetic transducing head assembly.
Figure 2:
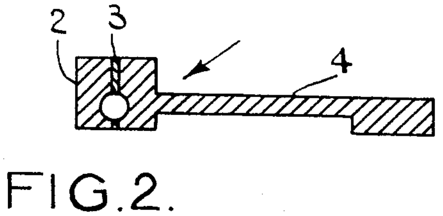
FIG. 2 is a sectional view along the line A—A of FIG. 1.
Figures 3, 4:
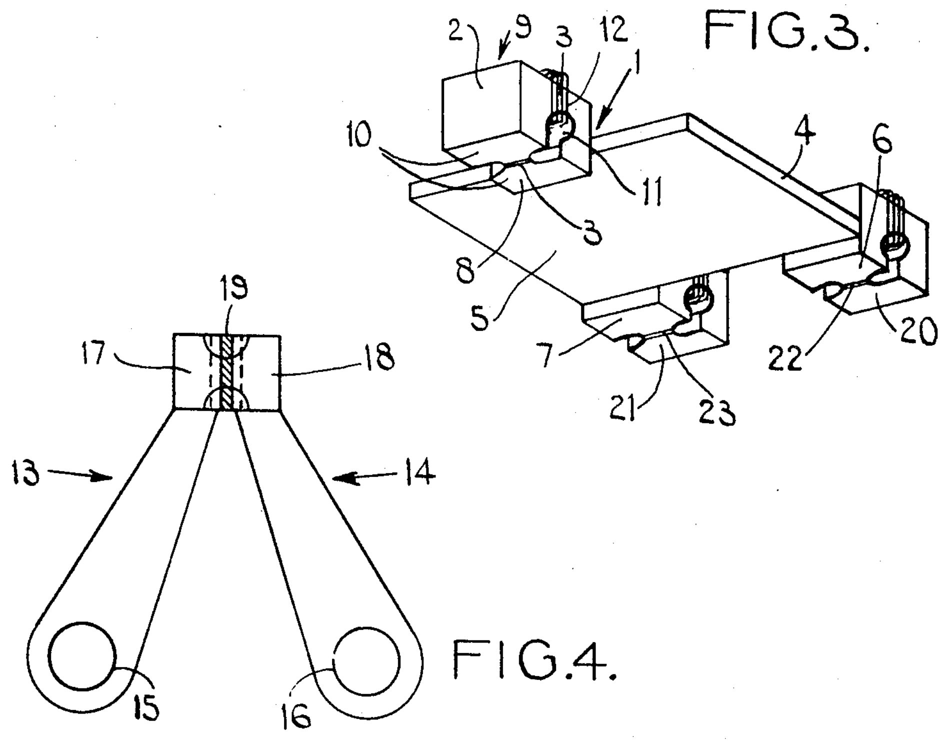
FIG. 3 is an underneath view of a modification of the assembly of FIG 1.
FIG. 4 is an underneath plan view of a further transducing head assembly.

Referring to FIGS. 1, 2 and 3, the assembly has two elements 1, 2 formed of ferrite which are bonded together with a very small gap therebetween by means of a thin layer of glass 3. The element 1 has the form of a flat rectangular plate 4 having a surface 5 from which two supports 6, 7 project and having on one edge one part 8 of a core of a magnetic reading and recording head 9. The element 2, bonded to the part 8, forms the remainder of the core of the head 9. The core projects from the plane of the surface 5 to approximately the same extent as the supports 6, 7 and has an operative face 10 through which the glass layer 3 extends to provide a non-magnetic transducing gap, for co-operation with a magnetic recording surface. If the head is to be used in contact with a planar rigid record disc, the face 10 of the head is co-planar with the exposed faces of the supports 6, 7. The face 10 and the faces of the supports form three support surfaces for the head assembly which are spaced apart in non-alignment, i.e., in triangular formation, so that the three faces form a three point support for the assembly. If it is desired to cause the assembly to fly at a small spacing from the recording surface the faces of the core and the supports may be so shaped as to entrain a thin film of air between these faces and the recording surface on which film the assembly flies.

An aperture 11 passes through the core, the axis of the aperture being so positioned that it lies approximately in the plane of the glass layer, to accommodate turns of a winding 12 coupled to the core.

If desired the transducing gap may extend in a different direction relative to the orientation of the three faces of the head 9 and supports 6, 7 from that shown in FIGS. 1, 2 and 3. For example the gap may extend in a direction perpendicular to that shown in FIGS. 1, 2 and 3. A construction of head assembly having such a non-magnetic transducing gap is shown in FIG. 4. In this construction each of two ferrite elements 13, 14 are in the form of a flat plate having on one end a support 15 (16) and on the other end a core part 17 (18). The elements 13, 14 are bonded together at the core parts by a glass film 19, to form a non-magnetic gap between the core parts 17 and 18. As in the embodiment shown in FIGS. 1, 2 and 3, the core and the supports 15, 16 have faces formed to co-operate with a recording surface to support the assembly either in contact with the recording surface or in a flying state spaced from the recording surface.

The magnetic head assembly is preferably formed by bonding two blocks of ferrite together with a layer of glass, spacers being provided between the blocks to ensure that the gap has the required dimension. The glass layer is formed in known manner by introducing the glass in a softened or molten state into the space between the ferrite blocks. After cooling and allowing the glass to harden, the bonded ferrite blocks are shaped to provide the desired configuration of plate, head core and supports by grinding and the faces of the head core and supports are subsequently lapped to the required profile. The aperture in the head core may be formed either by machining the ferrite blocks prior to bonding or may be formed by vapour blasting after the core has been shaped on its exterior. The core parts are further shaped in the region of the glass filled gap adjacent the operative face to define pole pieces of the core by vapour blasting, lapping, or other suitable machining processes.

Either or both of the supports of the magnetic transducing head assemblies according to the invention may consist of cores for additional magnetic reading and recording heads as shown in FIG. 3. In this case the ferromagnetic element 1 consists of a composite formed of three ferrite blocks bonded by thin layers of glass such that each of the supports 6, 7 is intersected by a layer of glass whereby the supports form additional magnetic cores having tranducing gaps 22,23 which are parallel to and offset from the gap 3 of the magnetic core 9.

It will be appreciated that the non-magnetic gap of each of the cores of an assembly must be formed parallel one to another in order that all the gaps may simultaneously be positioned transverse of their respective tracks on the recording surface.

By the formation of magnetic head assemblies as integral units of ferrite, various advantages are obtained, for example, the assembly would be more stable to temperature than a composite assembly. As all the surfaces are of ferrite, even wear of surfaces liable to wear is obtained. Further, such assemblies are easier to fabricate than composite assemblies in which a magnetic head is assembled into a carrier together with two support members of, for example, saphire or ruby as previously known.

We claim:

1. A trimaran air bearing magnetic transducing head assembly including a low-inertia integral structure of ferromagnetic material having a body portion and three support projections extending in the same direction from the body portion, the support projections being spaced apart from one another in triangular formation and respectively having formed thereon air bearing support surfaces, all the air bearing support surfaces lying in a common plane, at least one of the support projections forming a first portion of a magnetic transducing head; the head further including a second ferromagnetic portion; non magnetic material bonded between the first and second portions to form a non-magnetic transducing gap lying substantially perpendicular to said common plane; and a winding threading the head.

2. A trimaran air bearing magnetic transducing head assembly as claimed in claim 1 in which at least one support projection forms a part of a further transducer head.

3. A air bearing magnetic transducing head assembly as claimed in claim 1 in which the ferromagnetic elements are formed of ferrite.

* * * * *